United States Patent [19]
Adams

[11] 3,887,502
[45] *June 3, 1975

[54] PREPARATION OF RIGID POLYURETHANE FOAM HAVING IMPROVED AGING PROPERTIES

[75] Inventor: Pierrepont Adams, Darien, Conn.

[73] Assignee: Olin Corporation, New Haven, Conn.

[ * ] Notice: The portion of the term of this patent subsequent to Mar. 26, 1991, has been disclaimed.

[22] Filed: Jan. 16, 1974

[21] Appl. No.: 433,969

Related U.S. Application Data

[63] Continuation-in-part of Ser. No. 252,613, May 12, 1972, Pat. No. 3,799,963.

[52] U.S. Cl. .................. 260/2.5 AT; 260/2.5 AS
[51] Int. Cl. .................. C08g 22/44; C08g 22/26

[58] Field of Search.... 260/2.5 AT, 453 SP, 2.5 AS, 260/77.5 AT

[56] References Cited
UNITED STATES PATENTS

| 3,316,286 | 4/1967 | Kaplan | 260/2.5 AT |
| 3,522,285 | 7/1970 | Kirss | 260/2.5 AT |
| 3,799,963 | 3/1974 | Adams | 260/453 SP |

Primary Examiner—Donald E. Czaja
Assistant Examiner—C. Warren Ivy
Attorney, Agent, or Firm—F. A. Iskander; T. P. O'Day

[57] ABSTRACT

Rigid polyurethane foam having improved aging properties is derived from the crude product of the phosgenation of toluene diamine after this product has been heated in the presence of formic acid or selected derivatives thereof.

13 Claims, No Drawings

PREPARATION OF RIGID POLYURETHANE FOAM HAVING IMPROVED AGING PROPERTIES

This application is a continuation-in-part of copending U.S. application Ser. No. 252,613, filed May 12, 1972, now U.S. Pat. No. 3,799,963.

This invention relates to an improvement in the preparation of rigid polyurethane foam.

The utility of organic isocyanates, such as toluene diisocyanate, in the production of polyurethane elastomers and foams is well known in the art. A commonly used process for the commercial production of these organic isocyanates involves the phosgenation of a primary amine or polyamine. For example, toluene diisocyanate is commercially prepared by reacting toluene diamine with excess phosgene usually in the presence of an inert solvent reaction medium. After removal of the solvent, unreacted phosgene, and by-product hydrogen chloride from the reaction mixture, a crude toluene diisocyanate product is obtained. Quite often, the crude product of the phosgenation reaction, even after being subjected to proper separation and purification techniques, contains small proportions of acidic materials and hydrolizable chloride by-products. The presence of these materials is undesirable inasmuch as they have a detrimental effect on the utility of the isocyanate product in making polyurethane foam. Accordingly several methods have been suggested in the art for removing or reducing the acidity and hydrolyzable chlorine in organic isocyanates, particularly toluene diisocyanate. See for example U.S. Pat. Nos. 3,155,699, 3,264,336, and 3,458,558.

It is also known in the art to utilize the crude product of the phosgenation of toluene diamine in the production of polyurethane foam. See for example U.S. Pat. Nos. 3,215,652 and 3,471,417.

Now it has been found, according to the invention, that rigid polyurethane foam having improved aging properties can be prepared from a crude, substantially solvent-free product of phosgenating toluene diamine, provided this product is first heated in the presence of formic acid or selected derivatives thereof. This prior treatment, along with substantially reducing the acidity and hydrolizable chlorine content of the phosgenation product, has been found to have the added and unexpected advantage of improving the dimensional stability of foams prepared from the phosgenation product.

More in detail, rigid polyurethane foams are prepared, according to the invention, from a reaction mixture which is comprised of
1. a polyol,
2. a foaming agent,
3. a reaction catalyst, and
4. a toluene diisocyanate composition, which is the crude substantially solvent-free product of the phosgenation of toluene diamine, after said composition has been subjected to heating in the presence of formic acid or selected derivatives thereof.

In preparing the polyurethane foams of the invention, any polyol or combination of polyols, including polyether polyols and polyester polyols, may be employed. However, the use of polyether polyols is preferred. These may have a hydroxyl number from about 250 to about 800 and preferably about 300–650.

The polyether polyols include for example the oxyalkylated polyhydric alcohols. These are generally prepared by methods well known in the art such as reacting, in the presence of an alkaline or acid catalyst, a polyhydric alcohol initiator with an alkylene oxide such as ethylene oxide, propylene oxide, butylene oxide, amylene oxide, the halogenated alkylene oxides such as trichlorobutylene oxide, and mixtures of these alkylene oxides, using either random or step-wise addition. The preferred alkylene oxides are propylene oxide and trichlorobutylene oxide.

Polyhydric alcohol initiators suitable for use in preparing the polyether polyols are those having from 2 to 8 active hydrogens, and mixtures of such initiators. These include for example ethylene glycol, propylene glycol, butylene glycol, glycerol, trimethylolpropane, sorbitol, pentaerythritol, methyl glucoside, sucrose, dextrose (hydrous or anhydrous), and mixtures thereof. The preferred initiators are those which comprise a polyol having 4–8 active hydrogens such as pentaerythritol, methyl glucoside, sucrose and dextrose.

Particularly preferred polyether polyols for use according to the invention are those having a hydroxyl number of about 320–600 and an average functionability of 4–8 such as may be prepared by the oxyalkylation of a mixture of methyl glucoside, sucrose or dextrose with a lower-functionability polyol, i.e., having 2–3 active hydrogens, such as ethylene glycol, propylene glycol, butylene glycol, glycerol, trimethylolpropane, or a mixture thereof.

The polyurethane foams are prepared in the presence of a foaming agent which may be any of those known to be useful for this purpose. Illustrative are water and organic foaming agents containing up to about seven carbon atoms such as the halogenated hydrocarbons, lower molecular weight alkanes, alkenes, ethers, and mixtures thereof. The organic foaming agents, particularly the halogenated hydrocarbons, are preferred. Typical halogenated hydrocarbons include, but are not limited to, monofluorotrichloromethane, dichlorofluoromethane, difluorodichloromethane, 1,1,2-trichloro-1,2,2-trifluoroethane, dichlorotetrafluoroethane, ethylene chloride, methylene chloride, chloroform, and carbon tetrachloride. Other useful organic foaming agents include lower molecular weight alkanes, alkenes and ethers such as methane, ethane, ethylene, propane, propylene, pentane, hexane, heptane, ethyl ether, diisopropyl ether, mixtures thereof and the like. The amount of foaming agent employed may be varied within a wide range. Generally, however, the halogenated hydrocarbons are employed in an amount from about 1 to about 50, and preferably about 5–35, parts per 100 parts by weight of total polyol, and generally water is employed in an amount from about 1.0 to 6.0 parts by weight per 100 parts by weight of total polyol.

The polyurethane foams are prepared in the presence of a catalytic amount of a reaction catalyst. The catalyst employed may be any of the catalysts known to be useful for this purpose, or mixtures thereof such as tertiary amines and metallic salts, particularly stannous salts, and mixtures thereof. Typical tertiary amines include, but are not limited to, the following: N-ethyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octoate, and the like. Any catalytic proportion of catalyst or catalyst mixture may be employed such as from about 0.1 to about 3.0 percent, and preferably from about 0.5 to about 2.5 percent, by weight of total polyol.

It is preferred in preparing polyurethane foams according to the method of the invention to employ minor amounts of a conventional surfactant in order to further improve the cell structure of the polyurethane foam. Typical of such surfactants are the silicones, and the siloxaneoxyalkylene block copolymers. U.S. Pat. No. 2,834,748 and T. H. Ferrigno, *Rigid Plastic Foams* (New York: Reinhold Publishing Corp., 1963) pages 38–42, disclose various surfactants which are useful for this purpose. Generally up to 2 parts by weight of the surfactant are employed per 100 parts of the polyol.

The polyurethane foams of the invention are prepared from the crude product of the phosgenation of toluene diamine, after this product has been subjected to heating in the presence of formic acid or selected derivatives thereof.

As used in the specification and claims herein, the term "crude product of the phosgenation of toluene diamine" is intended to encompass any crude product of reacting toluene diamine, containing less than about 1.5 percent by weight of ortho-toluene diamine, with phosgene, which product has an NCO content from about 30 to about 45 percent by weight and is substantially free of solvent and hydrogen chloride by-product. Such a product can be prepared by conventional methods that are well known in the art. See for example U.S. Pat. No. 3,522,285, issued July 28, 1973, the entire disclosure of which is incorporated by reference herein. Thus, for instance, the undistilled product of the phosgenation of toluene diamine may be prepared by a process comprising the following steps:

a. mixing toluene diamine, such as the 80/20 isomer mixture of 2,4-/2,6-toluene diamine, with an inert organic diluent, such as monochlorobenzene, and a stoichiometric excess of phosgene, b. heating the mixture to a temperature of about 100°–200°C which is sufficient to bring about phosgenation of toluene diamine to the corresponding diisocyanate, c. removing substantially all of the diluent, the unreacted phosgene and the hydrogen chloride by-product, such as by conventional distillation preferably at sub-atmospheric pressure, d. optionally distilling a portion of the toluene diisocyanate from the degassed and solvent free phosgenation product so as to obtain a residual distilland in the form of a crude polyisocyanate composition having an NCO content of at least about 30 percent by weight, and e. if any precipitated or suspended solids are present in the phosgenation product, removing these such as by filtration.

Preferably the crude product of the phosgenation of toluene diamine has an NCO content of about 32–43 percent, and more preferably about 34–41 percent, by weight.

In accordance with the invention, the crude product of the phosgenation of toluene diamine is subjected to heating, in the presence of formic acid or selected derivatives thereof, before it is used in the preparation of polyurethane foam. This step is critical to achieving improved aging properties in the resulting foam.

Derivatives of formic acid which may be used according to the invention include the amide and anilide derivatives, all of which may be substituted or unsubstituted. It is also contemplated that compounds similar to these may be employed according to the invention such as oxalic acid, oxanilide and N,N'-diphenyl urea.

However, according to the preferred embodiments of the invention, one of the following compounds or mixtures thereof are employed:

a. formic acid, b. formamide, c. N-alkyl formamide, the alkyl group having 1–8 carbon atoms, such as N-methyl formamide, N,N-dimethyl formamide, N-propyl formamide, N,N-dipropyl formamide, N-hexyl formamide, and the like, d. unsubstituted anilide derivatives of formic acid such as formanilide and 1,3-diformyl benzene diamine, e. alkyl-substituted anilide derivatives of formic acid, the alkyl substituent having 1–8 carbon atoms and being on the nitrogen and/or on the aromatic ring, such as the N,N'-diformyl-toluene diamines (e.g., N,N'diformyl-2,4-toluene diamine and 2-N-methyl-N,N'-diformyl-2,4-toluene diamine), 2,6-diformyl ethyl benzene diamine, N-methyl-formanilide, and the like, and f. adducts of organic isocyanates and formic acid such as the adduct of one mole of toluene diisocyanate with one mole of formic acid.

Due to their particularly efficaceous activity in reducing the acidity and hydrolyzable chlorine of the toluene diamine phosgenation product, the following compounds are particularly preferred for use according to the invention: formic acid, formanilide, N,N'-diformyl-toluene diamine, N-methylformanilide, adducts of toluene diisocyanate and formic acid, or a mixture thereof.

The proportion of formic acid or its derivative which is employed according to the invention depends on the acidity and hydrolyzable chlorine content in the toluene diamine phosgenation product. Thus any suitable proportion may be employed which is effective in reducing the acidity and hydrolyzable chlorine content of this product. Generally, however, the use of great excesses of formic acid or its derivatives should preferably be avoided, as such excesses might increase the viscosity of the phosgenation product to an undesirable level. From a practical standpoint, a proportion of formic acid or its derivative ranging from about 0.05 to about 8 percent, preferably about 0.1–4 percent, and more preferably about 0.4–2 percent, based on the total weight of the crude phosgenation product, may be employed. But the use of lower as well as higher proportions is contemplated depending on the level of acidic and hydrolyzable chlorine impurity which is present.

In accordance with the process of the invention, the formic acid or a derivative thereof is mixed with the crude toluene diamine phosgenation product and the mixture is heated to a temperature above about 100°C but below that at which the organic isocyanate decomposes. Preferably this temperature ranges from about 120° to about 250°C and more preferably from about 150° to about 200°C.

It is preferred to carry out the heating step under moderate reflux conditions. This may be achieved using sub-atmospheric pressure. For example at a temperature of about 170°C, satisfactory reflux conditions usually obtain by using a reduced pressure of about 60–70 mm. of mercury.

It is also preferred to maintain the mixture in continuous agitation while it is being heated. Any suitable means of agitation may be used for this purpose.

The heating time required to achieve the full benefits of the invention depends on the temperature used, on the proportion and activity of the particular agent used, be that formic acid, any of its derivatives or a mixture thereof, and on the level of acidity and hydrolyzable chlorine which is desired. For successful use in making polyurethane foam having improved properties, the crude phosgenation product is treated according to the method of the invention until each of the acidity level and the hydrolyzable chlorine level is reduced to about 0.1 percent or less. Such a result can usually be achieved, by practicing the process of the invention, within about 1-4 hours and quite often within only 1 hour or even less.

After being heated for the desired length of time in the presence of formic acid or a derivative thereof, the crude product of the phosgenation of toluene diamine will be ready for immediate use, preferably after being cooled again to about room temperature, in making rigid polyurethane foam according to the invention. A sufficient proportion of this product is used to provide at least about 0.7, and preferably about 0.9–1.20, NCO groups per every hydroxyl group present in the foam forming reaction mixture.

In practicing the method of the invention, a polyurethane foam-forming reaction mixture comprising the above-described ingredients is placed in a suitable reaction zone, such as by pouring into a mold, onto a moving conveyor, or by spraying onto a surface where foaming takes place. The foaming reaction being exothermic, auxiliary heat is usually not necessary to effect the reaction, although such heat may be used if desired. When the foaming reaction is complete, the resulting foam may be allowed to cure at room temperature; or if desired heat may be used to accelerate the curing process.

The polyurethane foams of the invention are characterized by improved aging properties as determined according to ASTM test D 2126 for "Resistance of Rigid Cellular Plastics to Simulated Service Conditions." Thus the foams of the invention exhibit a marked decrease in dimensional change when subjected to prolonged service conditions of dry heat or humid heat. As such, these foams are of particular utility for example in the production of building and vehicular insulation, foam core partitions and panels, and in various molding applications.

The following examples are provided to illustrate the invention. In all these examples, a crude toluene diamine phosgenation product was used which had an NCO content of 39–39.5 percent by weight. This product, referred to (3) the examples are "the crude isocyanate composition," was prepared by a conventional method which comprises (a) reacting, at about 125°C, excess phosgene with a 10 percent solution of toluene diamine (mixture of 2,4- and 2,6-isomers) in monochlorobenzene, (b) removing the monochlorobenzene, unreacted phosgene and by-product HCl from the phosgenation product, (c) fractionally distilling this product into an overhead fraction consisting essentially of pure toluene diisocyanate and a bottom crude isocyanate fraction, (d) filtering the bottom fraction to remove solid matter therefrom, and (3) recovering the filtrate for use in the examples which follow. Unless otherwise specified, all parts and percentages in the examples are by weight.

EXAMPLE 1

To 600 parts of the crude isocyanate composition, there were added 6 parts of formic acid. The mixture was placed in an open vessel and heated, with continuous stirring, to a temperature of 170°C. This temperature was maintained for 2 hours during which time the vessel was continuously purged with $CO_2$. Thereafter the agitation was discontinued and the mixture cooled to room temperature. The resulting crude isocyanate composition, in which each of the acidity content and the hydrolizable chlorine content was below 0.1 percent, was used to prepare a rigid polyurethane foam based on the following formulation:

| Ingredients | Parts by Weight |
| --- | --- |
| Crude isocyanate composition | 86.0 |
| Polyether polyol[1] | 100.0 |
| Triethylene diamine catalyst[2] | 1.5 |
| Trichlorofluoromethane foaming agent | 32.0 |
| Silicone surfactant[3] | 2.0 |

[1]This is the product of oxypropylating a mixture of 4 moles of methyl glucoside and 1 mole of glycerine to a hydroxyl number of 425.
[2]This catalyst composition was purchased commercially under the trademark "Dabco-33LV".
[3]This surfactant was purchased commercially under the trademark "DC-193".

The above ingredients were mixed together and foamed in a square cardboard box. About 3 minutes after completion of the foaming reaction, the foam was tack-free and could be removed from the box. After being cured, the density of the foam and its dry heat aging and humid aging properties were tested, and the results are provided in the Table below. The dry heat aging and humid aging tests were carried out according to ASTM test D 2126 for "Resistance of Rigid Cellular Plastics to Simulated Service Conditions." The data in the Table represents the percent change in volume noted after standard foam samples are subjected to the indicated conditions for the specified number of days.

EXAMPLE 2

The identical procedure of Example 1 was followed except that instead of 6 parts of formic acid, 9 parts were used. The properties of the resulting foam are provided in the Table below.

Comparison

For purposes of comparison, the procedure of Example 1 was repeated using a similar crude isocyanate composition, which, however, was not heated in the presence of formic acid. The crude isocyanate composition used in this comparison was a commercially available crude toluene diamine phosgenation product having 39.5 percent NCO and less than 0.1 percent each of acidity and hydrolizable chlorine. The properties of the resulting foam are provided in the Table below.

TABLE

Foam Physical Properties

|  | Example 1 | Example 2 | Comparison |
|---|---|---|---|
| Density (lbs./cu.ft.) | 1.80 | 1.82 | 1.81 |
| Aging Properties (% volume change) | | | |
| dry heat aging at 200°F | | | |
| after 1 day | 0.55 | 0.72 | 0.87 |
| after 7 days | 2.20 | 2.36 | 3.30 |
| after 14 days | 1.82 | 2.41 | 3.62 |
| after 28 days | 2.40 | 2.50 | 4.98 |
| dry heat aging at 257°F | | | |
| after 1 day | 3.50 | 4.02 | 15.72 |
| after 7 days | 7.64 | 9.81 | 25.30 |
| after 14 days | 9.84 | 10.98 | 27.77 |
| after 28 days | 12.48 | 14.91 | 32.22 |
| humid aging at 158°F & 100% rel. humidity | | | |
| after 1 day | 12.41 | 13.33 | 20.80 |
| after 7 days | 19.05 | 21.43 | 36.66 |
| after 14 days | 23.92 | 24.83 | 42.88 |
| after 28 days | 26.30 | 28.71 | 48.47 |

The data in the Table above demonstrates the marked improvement in foam aging properties which obtains by practicing the process of the invention. Thus there is one basic difference between the methods and formulations used to prepare the foams of Examples 1 and 2 on the one hand and the foam of the Comparison on the other hand. This is that the Example foams were prepared from a crude toluene diamine phosgenation which had been preparatorily heated in the presence of formic acid; whereas the foam of the Comparison was prepared from a crude toluene diisocyanate phosgenation product which, while very similar to the product used in the Examples, had not been subjected to the formic acid treatment. Yet by virtue of this difference, the Example foams exhibit a substantial increase in dimensional stability as compared with the Comparison foam.

What is claimed is:

1. In a process for preparing a rigid polyurethane foam from a reaction mixture comprised of a polyol, a foaming agent, a reaction catalyst and a crude product of the phosgenation of toluene diamine, the improvement which comprises heating said crude product, before it is used in making said foam, to a temperature of about 120°–250°C in the presence of about 0.05–8 percent by weight, based on the weight of said crude product, of formic acid.

2. The process of claim 1 wherein said crude product, after being heated in the presence of formic acid but before it is used in making said foam, is cooled to about room temperature.

3. The process of claim 2 wherein said polyol is a polyether polyol having a hydroxyl number of about 250–800.

4. The process of claim 3 wherein said crude product has an NCO content of about 32–43 percent by weight.

5. The process of claim 4 wherein said polyether polyol is an oxyalkylated polyhydric alcohol having a hydroxyl number of about 300–650.

6. The process of claim 5 wherein said polyether polyol is the product of reacting propylene oxide or tri- chlorobutylene oxide with a polyhydric alcohol initiator having 2–8 active hydrogens.

7. The process of claim 6 wherein said crude product has an NCO content of about 34–41 percent by weight.

8. The process of claim 7 wherein said temperature ranges from about 150° to about 200°C and said formic acid is employed in a proportion of about 0.1–4 percent, by weight based on the weight of said crude product.

9. The process of claim 8 wherein said heating is carried out at subatmospheric pressure.

10. The process of claim 8 wherein said crude product is prepared by a process which comprises
   a. mixing toluene diamine with an inert organic diluent and a stoichiometric excess of phosgene,
   b. heating the mixture to about 100°–200°C in order to bring about the phosgenation of said toluene diamine to toluene diisocyanate, with the concurrent formation of hydrogen chloride as a by-product,
   c. removing substantially all of the diluent, the unreacted phosgene and the hydrogen chloride by-product,
   d. optionally removing, by distillation, a portion of the toluene diisocyanate in the phosgenation product and recovering, as a residual distilland, said crude phosgenation product, and
   e. removing any precipitated or suspended solids that may be present in said crude phosgenation product.

11. The process of claim 10 wherein said polyether polyol has a hydroxyl number of about 320–600, an average functionability of 4–8 and wherein said polyhydric alcohol initiator comprises pentaerythritol, methyl glucoside, sucrose or dextrose.

12. The process of claim 11 wherein said reaction mixture comprises a surfactant.

13. The process of claim 12 wherein said catalyst is triethylene diamine and said foaming agent is a halogenated hydrocarbon foaming agent.

* * * * *